O. A. DONATH.
VALVE REVERSING GEAR.
APPLICATION FILED AUG. 30, 1910.

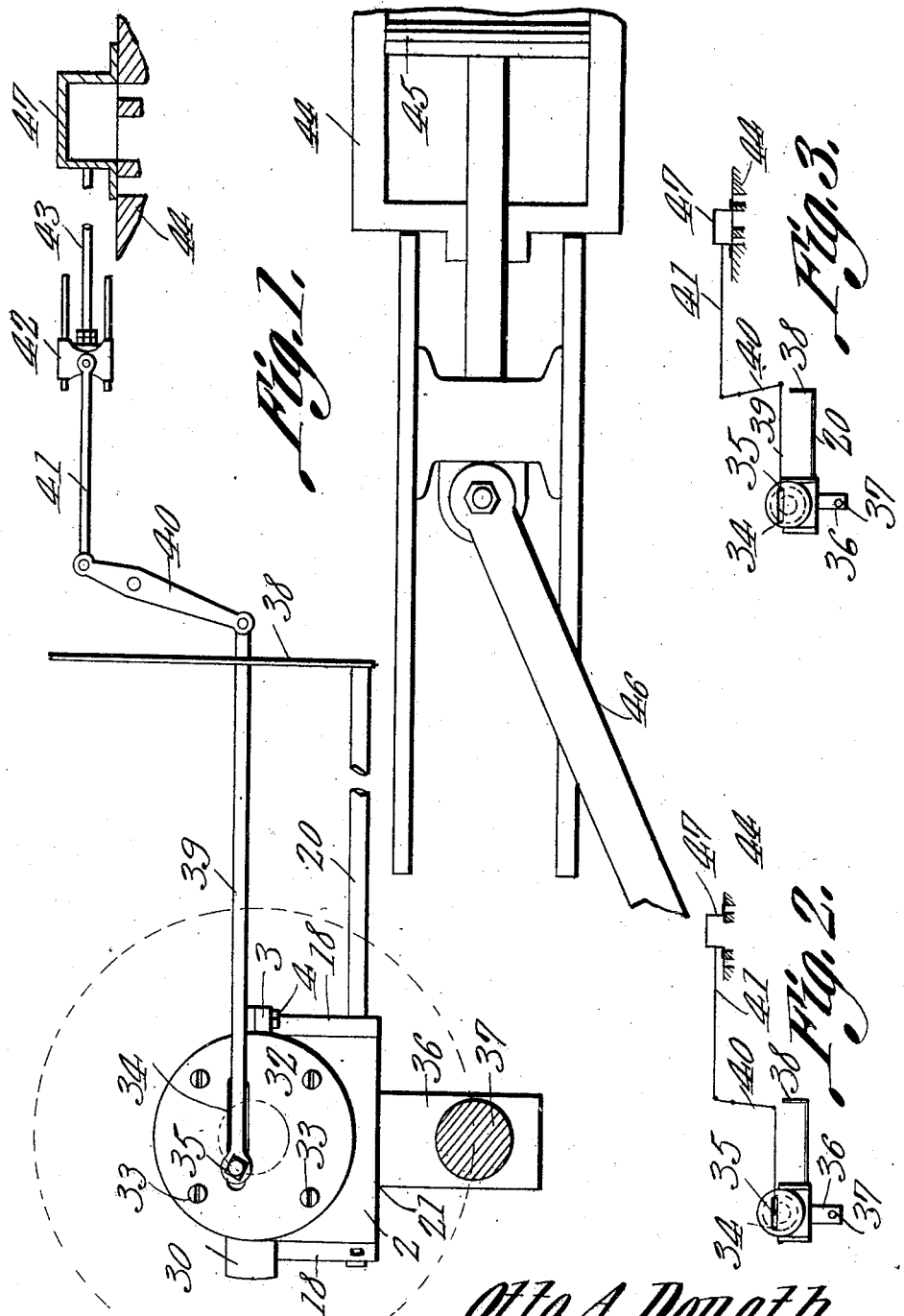

991,489.

Patented May 9, 1911.

2 SHEETS—SHEET 2.

Witnesses:

Otto A. Donath, Inventor,
by C. A. Snow & Co.
Attorneys.

UNITED STATES PATENT OFFICE.

OTTO A. DONATH, OF SEDALIA, MISSOURI.

VALVE-REVERSING GEAR.

991,489.

Specification of Letters Patent.

Patented May 9, 1911.

Application filed August 30, 1910. Serial No. 579,670.

*To all whom it may concern:*

Be it known that I, OTTO A. DONATH, a citizen of the United States, residing at Sedalia, in the county of Pettis and State of Missouri, have invented a new and useful Valve-Reversing Gear, of which the following is a specification.

This invention relates to valve reversing gear for locomotives.

One object of the present invention is, in a ready and practical manner, to dispense with eccentrics and links in setting the valve, thus to obviate an objection present in many forms of reversing gears now in use, whereby danger of derangement and wear are reduced to a minimum, and the cost of production proportionally lessened.

A further object is to adapt the invention to existing engines without necessitating any material change in its frame structure and none in its valves.

A final object is to provide a novel reversing gear that shall be simple of construction, efficient and durable in use, and easy of application.

With the above and other objects in view, as will appear as the nature of the invention is better understood, the same consists in the novel construction and combination of parts of a reversing gear for locomotives, as will be hereinafter so described and claimed.

Figure 4:
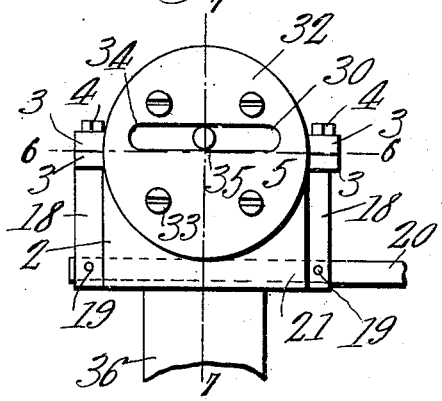
Figure 5:
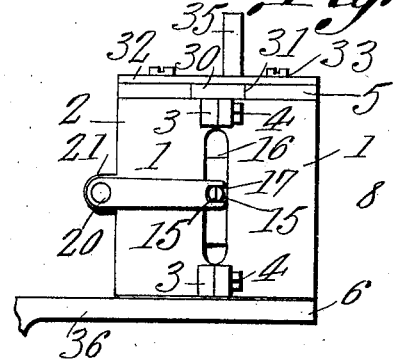
Figure 6:
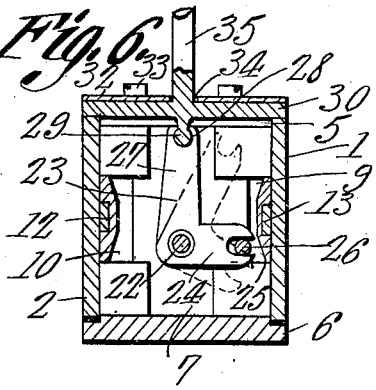
Figure 7:
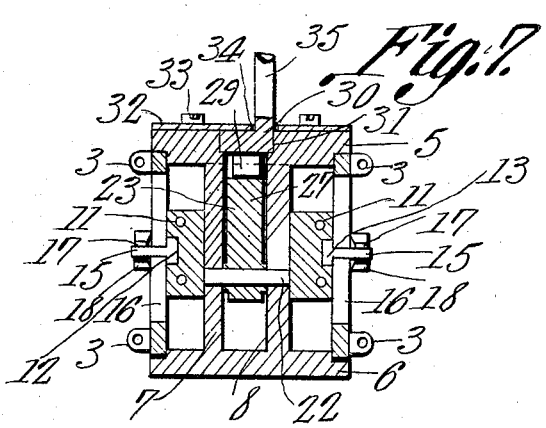
Figure 8:
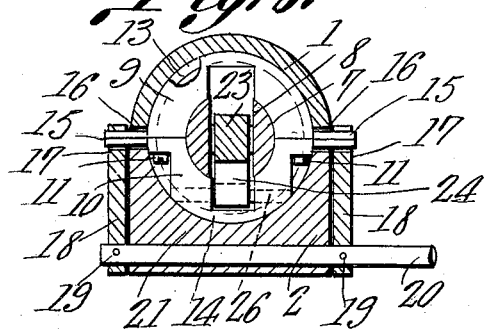
Figure 9:
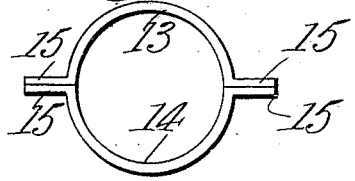

In the accompanying drawings forming a part of this specification, and in which like characters of reference indicate corresponding parts: Figure 1 is a view in the nature of a diagram showing the application of the reversing gear to that portion of a locomotive with which it coacts. Fig. 2 is a similar view showing the position of the reversing gear when set to allow the valve no travel except the distance of its lap. Fig. 3 is a view similar to Fig. 2 showing the position of the reversing gear when set to allow full throw of the valve. Fig. 4 is a view in end elevation of the device, with parts broken away. Fig. 5 is a view in side elevation. Fig. 6 is a vertical sectional view, taken on the line 6—6 Fig. 4. Fig. 7 is a horizontal sectional view taken on the line 7—7 Fig. 4. Fig. 8 is a transverse sectional view taken on the line 8—8 Fig. 5. Fig. 9 is a detail view of a portion of the device.

The apparatus embodies a two-part cylinder comprising sections 1 and 2, each being provided with two pairs of orificed ears 3 held rigidly assembled by bolts 4. The ends of the cylinder are closed by heads 5 and 6 that in this instance form integral parts of a spindle 7 which is provided with an all-through slot 8 that extends from end to end. Slidably mounted on the spindle and loosely fitting within the cylinder is a collar composed of two sections 9 and 10 connected by screws 11. The collar is provided with a circumferential groove 12 in which fits a ring, composed of two semi-circular sections 13 and 14, the terminals of each of which carry outstanding pins 15 which, as shown in Fig. 5, are semi-circular in cross section with their flat faces juxtaposed, thereby causing the compound pins produced to be circular in cross section. The pins project outward beyond the walls of the cylinder through slots 16 formed in the meeting edges of the cylinder section, and engage crotches 17 formed in the ends of a pair of arms 18 secured by a pin 19 to a rod 20 that is journaled in a lug or boss 21 which constitutes the lower end of the cylinder section 2. Pivoted within the slot 8 of the spindle and upon a pin 22 extending therethrough is a bell crank lever 23, the shorter arm 24 of which is provided in its end with a crotch 25 that is designed to straddle a pin 26 carried by the collar. The longer arm 27 of the lever is provided in its end with a crotch 28 that is designed to straddle a round faced lug 29 depending from a plate 30 mounted to slide in a guide way 31 formed in the cylinder head 5, and being held for operative movement therein by a disk 32 secured to the head by screws 33. Projecting upward from the slide plate and working in a slot 34 in the disk is a pin 35, which, as will appear later on, is connected by intermediate mechanism with the slide valves of the engine.

The head 2 of the cylinder carries an arm 36 designed to engage the crank pin 37 of the locomotive driver and rotates therewith, while the cylinder is held stationary by the rod 20 to which a lever 38 is rigidly secured that is connected with the reversing lever and operated from the engine cab in the usual manner.

By reference to Fig. 1 it will be seen that the pin 35 of the slide plate connects by a rod 39 with one end of a link 40, and the other end of the latter through a rod 41 with the cross head 42 of the valve rod 43. In this figure the cylinder 44, piston 45, connecting rod 46 and slide valve 47 may be of the usual or any preferred construction, and are merely shown to render clear an understanding of the invention.

In operation, let it be assumed that the pin 35 is in the position shown in Fig. 2, under which conditions the slide valve merely floats and has a travel only equal to its lap. When it is desired to start the engine, the lever 38 is shifted from the cab to bring the pin say to the position shown in Fig. 3. This motion is transmitted to the rod 20 and as the lever turns, the arms 18 shift the two-part ring thereby causing the collar to slide on the spindle. This latter motion through the medium of the pin 26 rocks the bell crank lever which in turn adjusts the slide plate to the position desired, and the motion of the plate is transmitted to the slide valve by the connections 39, 40, 41 and 43 and sets the valve.

It will be seen from the foregoing description that accurate and positive setting and operation of the slide valve is secured without the employment of links and levers for the purpose, and further that by reason of the arrangement of the parts, derangement in use will be only a remote contingency.

What is claimed is:

1. A device of the class described embodying a member to be attached to and rotate with the driver of a locomotive, a second member stationary relative to the first, a slidable element arranged to be connected with the slide valve of an engine, and means for shifting the slidable element to control the operation of the valve.

2. A device of the character described embodying a cylinder, heads for closing the cylinder, a spindle connecting the heads, a collar movable on the spindle, means for actuating the collar, a sliding member actuated by the movement of the collar, and means for transmitting the movements of the sliding member to the slide valve of an engine.

3. A device of the character described comprising a cylinder, a spindle therein, cylinder heads secured to the spindle, one of which embodies a member to be connected with the crank shaft of an engine and the other a sliding member, a collar movable on the spindle, a bell crank lever arranged within the spindle and designed to operate the sliding member, means carried by the collar to rock the bell crank lever, means for imparting sliding motions to the collar, and means for imparting such motions to the slide valve of an engine.

4. A device of the character described comprising a cylinder, a slotted spindle arranged therein, cylinder heads secured to the spindle, a collar slidable on the spindle, a ring movable with the collar and having pins projecting at each side beyond the cylinder, a rod carried by the cylinder, arms carried by the rod and having terminal crotches to straddle the pin, a bell crank lever pivoted within the slot of the spindle, a sliding member combined with one of the cylinder heads and having a depending lug and an outstanding pin, the lug being arranged to engage a crotch in one of the arms of the lever, a pin carried by the collar and engaging a crotch in the other arm of the lever, means for actuating the collar to shift the sliding member, and means for imparting motion from the sliding member to the slide valve of an engine.

In testimony that I claim the foregoing as my own, I have hereto affixed my signature in the presence of two witnesses.

OTTO A. DONATH.

Witnesses:
 GEO. A. DONATH,
 GEORGE L. SMITH.

---

Copies of this patent may be obtained for five cents each, by addressing the "Commissioner of Patents, Washington, D. C."